United States Patent [19]

Halvorsen et al.

[11] 4,375,069
[45] Feb. 22, 1983

[54] PROGRAMMABLE FORMAT SEQUENCER FOR DISK DRIVE

[75] Inventors: Eric J. Halvorsen, East Layton; David T. Cornaby, Roy, both of Utah

[73] Assignee: Iomega Corporation, Ogden, Utah

[21] Appl. No.: 257,469

[22] Filed: Apr. 24, 1981

[51] Int. Cl.³ .......................... G11B 5/09; G11B 15/18
[52] U.S. Cl. ..................................... 360/49; 360/72.2
[58] Field of Search ........................... 360/72.2, 39, 49

[56] References Cited

U.S. PATENT DOCUMENTS 3,631,421 12/1971 Perkins ............................... 360/72.2
3,701,130 10/1972 Ault ....................................... 360/49

*Primary Examiner*—Vincent P. Canney

*Attorney, Agent, or Firm*—Woodcock, Washburn, Kurtz, Mackiewicz & Norris

[57] ABSTRACT

An improved format sequencer for use in conjunction with a disk drive is disclosed which features read-only memory means for outputting appropriate control signals to the various functional elements of the disk drive upon detection that a number of bytes equal to the number of bytes to be in a given segment of a disk track have passed by a read/write head in a given period of time. The length of each segment in bytes is stored in the read-only memory means together with appropriate control signals to be output thereby in correspondence with a particular segment being juxtaposed to the read/write head. In this way, the format of each sector of each track is controlled by the read-only memory means.

6 Claims, 2 Drawing Figures

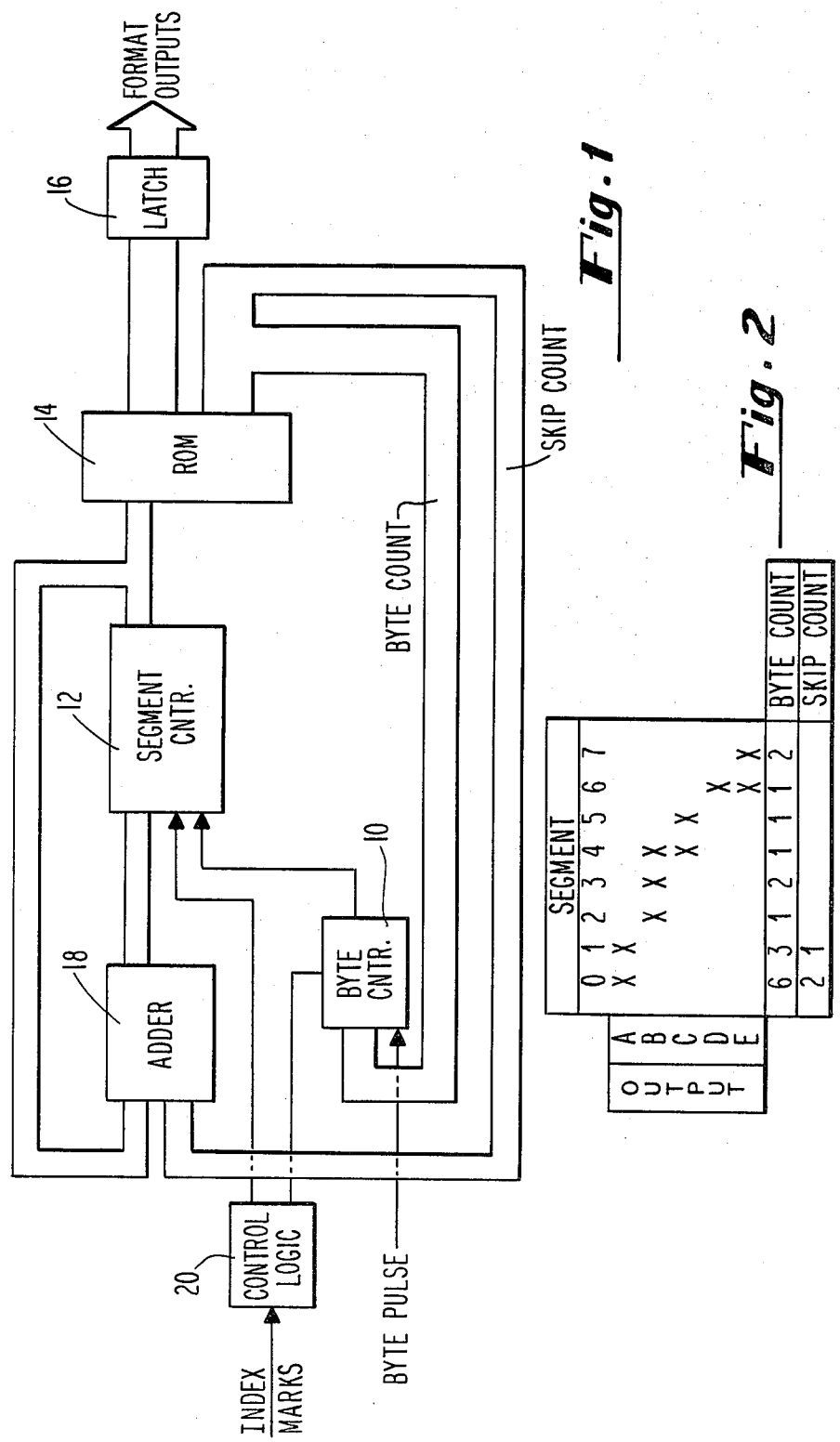

PROGRAMMABLE FORMAT SEQUENCER FOR DISK DRIVE

FIELD OF THE INVENTION

The present invention relates to means and methods for controlling the operation of a magnetic disk drive. More particularly, the invention relates to a format sequencer for generating signals indicative of where within a given sector the read/write head is at any given time; i.e., the format sequencer of the invention keeps track of the relative position of the head and the disk.

BACKGROUND OF THE INVENTION

This invention relates to control of operation of magnetic disk drives of the type in which the disk is divided into "hard" sectors; that is, one in which the format of the disk is permanently defined at the time of manufacture of the disk. In particular the disk is divided into sectors by radial index marks followed by information defining the various tracks extending circularly around the disk. Each track is thus divided by the index mark into a plurality of sectors. Within each sector there are various permanently written data used for identification of the track and of the sector and for, e.g., timing of the data read and write operations as well as areas left for the actual storage of data on the disk. In order that the head can be properly controlled to read and write the data at the appropriate time, a format sequencer is required in order to keep track of the position of the head with respect to the disk. That is, to provide a signal indicating that, for example, the head is currently juxtaposed to the data field. Clearly, it would be desirable that such a format sequencer be capable of performing as many operations with as little hardware as possible. Further, it would be desirable if such a format sequencer could be used as well as for actual format sequencing, for example, for data read and write control.

OBJECTS OF THE INVENTION

Accordingly, it is an object of the invention to provide an improved format sequencer.

It is a further object of the invention to provide a format sequencer which is capable of defining the position of a read/write head with respect to a track at any given time, as well as for timing of actual read/write operations.

A further object of the invention is to provide a format sequencer which retains proper control of read/write operations despite varying data processing operations performed external to a host computer, e.g., error detection and correction, data encoding, and the like.

SUMMARY OF THE INVENTION

The above needs of the art and objects of the invention are fulfilled by the present invention which provides a format sequencer running in synchronization with a parallel data channel, rather than in synchronization with actual fields on the disk. In this way, the format sequencer runs independent of detection of the various disk address marks and the like so that its operation is not limited to performance of this function. Moreover, the use of the parallel data channel as the sequencing means permits various disk format segments to be ignored in the event, for example, that other functional logic units require differing amounts of time to perform various data operations. The invention is implemented by use of a read-only memory (ROM) in which are stored data indicative of the various portions of each data sector. By counting actual data bytes at the byte rate, the format sequencer knows at all times where it is with respect to the sector, so that detection of address marks denoting the actual data fields is not required for position information purposes.

BRIEF DESCRIPTION OF THE DRAWINGS

The invention will be better understood if reference is made to the accompanying drawings, in which:

FIG. 1 shows a diagram of the format sequencer of the invention; and

FIG. 2 shows a logic diagram of how segments within a given sector might be organized.

DESCRIPTION OF THE PREFERRED EMBODIMENTS

As discussed above, the invention is designed to be used in connection with a disk drive of the type in which index marks extending radially across the surface of the disk are permanently written to the disk during manufacture. These index marks which divide the disk surface into sectors are individually distinguishable from all combinations of data written on the disk. Accordingly, they provide a reliable indication of the beginning of each sector.

Referring now to FIG. 1, which shows a diagram of the invention, the index mark is passed upon detection to a byte counter 10 and to a segment counter 12. Each sector is divided into identical segments which may comprise, for example, servo sampling signals used to provide proper centering of the head over the track, and to indicate the beginning of the area on disk for the writing of data thereto. The byte counter counts bytes as detected and is used to step the segment counter upon indication that the appropriate number of bytes within each segment has been counted, as defined by information stored in a read-only memory (ROM) 14. The segment counter 12 is reset to zero at the beginning of the sector. Upon detection that a given segment has been reached, the ROM 14 outputs segment-defined information to a latch 16 used to provide control signals to other portions of the disk controller, e.g. to enable read/write circuitry and to load the byte counter to begin counting bytes to measure the length of the next segment.

It will be appreciated that thus defining the segments allows multiple synchronization (sync) marks to be used to confirm that the head is, in fact, juxtaposed to the portion of the disk to which the format sequencer "thinks" it is. That is, position detection becomes fail-safe. For example, the format sequencer can thus be used to control the opening of "windows" in time in which address or "sync" marks are expected to be detected. If such a sync mark is not detected, an adder 18 can be used to step the segment counter ahead, and accordingly the ROM 14, through the next segment, thus opening the next window.

Thus, a previously defined sector format consists of segments. Specific format sequencer outputs are active during each segment. These outputs provide timing to other areas of the disk controller. The duration of each segment is determined by a byte count stored in the ROM together with the outputs appropriate for the particular segment within the sector.

The sequencer is initialized at segment 0 by clearing the segment counter 12 and loading the byte count for the sector 0 into the byte counter 10. The output latch 16 is then set to hold the ROM output. That is, the control signal appropriate for segment 0 is output by the ROM to the latch. The byte counter 10 is decremented upon detection of each byte pulse until it reaches zero. At this time, the segment counter 12 is incremented to the next segment. The segment counter 12 outputs address a new ROM location and accordingly a new byte count is loaded into the counter and the output latch 16 is clocked to provide a new output at the beginning the new segment. Some of the outputs of the ROM may provide windows in which sector or data synchronization pulses should be detected. The format sequencer synchronizes itself to the parallel data channel bus, and in turn to the disk, by opening a window in which a sync mark is expected to be found. If a mark was found, the sum of the current segment number and a skip increment also provided by the ROM 14 is loaded into the segment counter 12. Thus, using the adder 18 the format sequencer of the invention synchronizes itself with that position on the disk directly following the synchronization pattern. If, instead, the mark is not detected during the window, the adder is invoked to skip ahead in segments, thereby "catching up" to the actual position of the head with respect to the disk. This capability is also utilized in the event that the sequencer must skip a particular segment, for example, depending on the type of data operation being executed. Control logic 20 may be provided to thus operate the adder 18. In this way, the synchronization marks, definition of segments, skip increments and byte counts keep the sequencer in synchronization with the parallel data channel bus, notwithstanding the mode of operation of the disk controller. For example, the disk drive within which the present format sequencer is designed to be used incorporate error correction logic, as more fully defined in co-pending application Ser. No. 257,384 filed Apr. 24, 1981. While these operations are going on, it is important that the format sequencer maintain control of the location of the disk with respect to the head so that upon correction of the errors, the appropriate data can be rewritten to the disk.

FIG. 2 shows typical outputs which can be output by the latch 16 during various segments of each sector; that is, could be stored in the ROM, together with byte counts indicating the length of the segments and skip counts indicative of where the adder output should be loaded into the segment counter. Typical segments are defined horizontally at the top of FIG. 2 by numbers 0 through 7, while the output signals are indicated vertically A through E. The byte count, that is, the length of the segment expressed in bytes, is written at the bottom of the drawing and thus controls the sector length in accordance with the byte counter incrementing the segment counter and hence the ROM, while skip counts are also provided to the first two segments if, for example, these segments were not provided with index marks. For example, these segments of each section might comprise analog position signal information used to control the position of the head with respect to the disk, rather than digital information comprising detectable synchronization marks. Hence, the adder would be skipped over the segments to keep the sequencer properly in accordance with the actual area of the sector juxtaposed to the read/write head at any given time.

Those skilled in the art will recognize that the use of the byte count to control the sector counting permits the format sequencer to be kept in constant synchronization with the actual bytewise data written to or read from the disk, which ensures that even if an identification mark is missed, such that, for example, a particular sector would not be available for reading or writing, the format sequencer maintains its "knowledge" of the present location of the disk with respect to the head. The read-only memory thus may be said to define the actual sector format. Moreover, the sequencer of the invention eliminates the need for timing adjustments in control circuits external to the sequencer required due to differences in the reading and writing rates, thus reducing cost and complexity.

Those skilled in the art will recognize that there are numerous modifications and improvements that can be made to the invention without departing from its essential spirit and scope which is therefore not to be construed as limited by the above exemplary disclosure, but only by the following claims.

We claim:

1. A programmable format sequencer for providing control signals to disk drive apparatus, said signals being output in response to a determination that particular portions of a disk are juxtaposed to a read/write head at a given time, said format sequencer comprising:
    means for counting bytes of data recorded on said disk;
    means for comparing said count with predetermined numbers of bytes defined to be within a given track segment on said disk;
    means for outputting appropriate control signals for each said segment; and
    means for sequentially supplying byte counts corresponding to each said segment to said comparator for use in each said comparison step.

2. The apparatus of claim 1 wherein said means for providing control signals for each said comparison step comprises read-only memory means.

3. The apparatus of claim 2 wherein segment counter means are additionally provided for counting said segments and outputting the results of said count to said read-only memory means to define sectors of said disk.

4. The apparatus of claim 3 additionally comprising adder means for incrementing said segment counter means in response to variance of said sequence from that stored in said read-only memory means.

5. Method of controlling a disk drive comprising the steps of:
    counting bytes on a disk rotating in juxtaposition to read/write head means;
    comparing the numbers of said bytes with predetermined numbers of bytes corresponding to defined segments of the disk surface; and
    outputting control signals to said drive indicative of location of said segments in response to detection of the passage of numbers of said bytes equal to said predetermined numbers of said bytes corresponding to the length of said segments on said disk.

6. The method of claim 5 wherein said control signals are outputted by read-only memory means upon detection that the number of bytes detected in a given segment is equal to the length of said segment measured in bytes, whereby said control signals define the sequence of said defined segments of the disk surface.

* * * * *